United States Patent

Landry-Coltrain et al.

Patent Number: 6,025,015
Date of Patent: Feb. 15, 2000

[54] SIMULTANEOUS COATINGS OF STEARAMIDE LUBRICANT LAYER

[75] Inventors: Christine J. Landry-Coltrain; Bradley K. Coltrain, both of Fairport; Michael J. Corrigan, Hilton, all of N.Y.

[73] Assignee: Eastman Kodak Company, Rochester, N.Y.

[21] Appl. No.: 08/999,913

[22] Filed: Dec. 29, 1997

Related U.S. Application Data

[62] Division of application No. 08/858,679, May 19, 1997, Pat. No. 5,756,272.

[51] Int. Cl.$^7$ ........................................................ B05D 5/12
[52] U.S. Cl. ........................ 427/130; 427/131; 427/132; 427/164; 427/385.5
[58] Field of Search .................................... 427/130, 131, 427/132, 164, 385.5

*Primary Examiner*—Bernard Pianalto
*Attorney, Agent, or Firm*—Carl F. Ruoff

[57] ABSTRACT

The present invention is a photographic element which includes a support, and at least one light-sensitive silver halide layer on a front side of the support. The photographic element has on the backside of the support an antistatic layer; a transparent magnetic recording layer; and a lubricating overcoat layer. The lubricating overcoat layer is farthest from the support and includes a lubricant of the general formula:

$$R\text{—}CONH_2$$

where R is a long chain hydrocarbon between 12 and 30 carbons, preferably between 16 and 22.

The present invention also provides a method of producing an imaging support which includes, providing a support, and simultaneously coating on the support; a transparent magnetic recording layer including magnetic particles, a polymeric binder and an organic solvent, and a lubricating overcoat layer, the lubricating overcoat layer comprising a lubricant of the general formula:

$$R\text{—}CONH_2$$

where R is a long chain hydrocarbon between 12 and 30 carbons, preferably between 16 and 22, and an organic solvent, and drying the magnetic recording layer and the lubricating overcoat layer.

8 Claims, No Drawings

SIMULTANEOUS COATINGS OF STEARAMIDE LUBRICANT LAYER

This is a Divisional of prior application Ser. No. 08/858,679, filed May 19, 1997, now U.S. Pat. No. 5,756,272.

FIELD OF THE INVENTION

The present invention relates to photographic elements having transparent magnetic recording layers. More particularly, the present invention provides a method of simultaneously coating a transparent magnetic layer and a fatty acid amide lubricant layer on a photographic element and the resultant product.

BACKGROUND OF THE INVENTION

Backing layers that can be used to magnetically record, and subsequently, to retrieve, information require excellent lubrication at their surface. Contact between the magnetic head and the outermost surface of the backing layers of the film is necessary, however, this imposes a great amount of stress to the backing layers and may result in rupture of the layer, and in loss of signal. Good lubrication allows for multiple transports of the film through various magnetic head-containing equipment. The lubricant must also remain effective after the film has been run through photographic processing solutions.

In general, the transparent magnetic layer and the lubricating layer are applied in separate coating steps. This reduces the manufacturing efficiency of the product by requiring several coating stations. Alternately, the lubricious material can be added directly to the transparent magnetic layer. However, this typically weakens the layer and can result in premature rupture of the layer and loss of signal or recorded information. Furthermore, when the lubricant is added directly into the magnetic layer and coated and dried, the lubricant will be distributed throughout the magnetic layer and may not reside primarily at the surface where it is required for optimal performance.

Photographic elements containing transparent magnetic oxide coatings on the side opposite the photographic emulsions have been well-documented. The need for lubricating layers on the magnetic oxide coatings has also been well-described. A variety of types of lubricants have been disclosed including fatty acids, fatty acid esters, silicones, waxes, etc. Typically these layers have been applied by first coating a solution of the magnetic oxide layer onto a support using a bead coating technique. The coating is then dried and a lubricant layer is then coated over the magnetic layer using a similar technique. Alternatively, the lubricant can be added to the magnetic oxide coating solution such that both the magnetics and lubricant are coated simultaneously. This is advantageous because less coating stations are required, likely reducing waste and simplifying the production. Unfortunately, in order for the lubricant to be effective it must primarily reside at the uppermost surface of the dry coating. When the lubricant is added to the magnetic oxide solution, it is difficult for the lube to get to the surface. As the solution dries rapidly, the polymeric binder for the magnetic oxide will vitrify or solidify, which retards the mobility of the lubricant. Additionally, the lubricant may also go to the support/magnetics interface instead of the desired magnetics/air interface. The result is an improperly lubricated surface, or a coating with a high coefficient of friction.

Another drawback of adding the lubricant directly to the magnetics layer is that phase separation can occur resulting in a translucent or opaque film. The lubricant can destabilize the magnetics dispersion, resulting in flocculation of the particles. Also, the lubricant may not be compatible with the magnetics binder, which can lead to gross phase separation and loss of optical transparency. It is desired to have the lubricant phase separate and migrate to the interface, without the loss of optical transparency. Obviously a very selective phase separation is desired and is difficult to control. Alternatively, the lubricant may not be soluble, or dispersible in the same solvents as are needed for the components of the transparent magnetic layer.

Multilayer coatings of transparent magnetic layers, including simultaneously coating multiple magnetic oxide containing layers, and simultaneously coating antistat and magnetic oxide containing layers are described in EP 0537778A1 and EP 0565870A1. However, these applications do not describe simultaneously coating a lubricant layer and the magnetic oxide containing layer.

The use of fatty acid ester derivatives as lubricants for transparent magnetic oxide-containing packages is discussed in the following references. U.S. Pat. No. 5,294,525 teaches the use of many stearates as lubricants within the transparent magnetic layer, however, there is no mention of stearamide. EP 0 476 535 A1, 1991 (APP number 91115547.1) teaches a variety of lubricants. U.S. Pat. No. 4,275,146 claims the use of higher fatty acid amides containing at least one double bond for a photographic element; however there is no discussion of a transparent magnetic layer. U.S. Pat. No. 5,336,589 lists typical slip agents, including stearamide and erucamide. Methods of introducing the slip were to dissolve it in the layer, or to add it by spray coating, dip coating, bar coating, or spin coating.

In this invention is described a means of co-coating the magnetics and lubricant layers but without the problems described above. In this case the well-known simultaneous coating technique, slide coating, is used. However, as will be shown in the examples, simply simultaneously coating the two solutions does not ensure success. The present invention provides low coefficient of friction and durability for excellent performance under a magnetic head. The combination of the magnetic layer and the lubricant is transparent and does not interfere with the transmission of light through the photographic element.

SUMMARY OF THE INVENTION

The present invention is a photographic element which includes a support, and at least one light-sensitive silver halide layer on a front side of the support. The photographic element has on the backside of the support an antistatic layer; a transparent magnetic recording layer; and a lubricating overcoat layer. The lubricating overcoat layer is farthest from the support and includes a lubricant of the general formula:

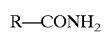

where R is a long chain hydrocarbon between 12 and 30 carbons, preferably between 16 and 22.

The present invention also provides a method of producing an imaging support which includes, providing a support, and simultaneously coating on the support; a transparent magnetic recording layer including magnetic particles, a polymeric binder and an organic solvent, and a lubricating overcoat layer, the lubricating overcoat layer comprising a lubricant of the general formula:

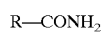

where R is a long chain hydrocarbon between 12 and 30 carbons, preferably between 16 and 22, and an organic solvent, and drying the magnetic recording layer and the lubricating overcoat layer.

DETAILED DESCRIPTION OF THE INVENTION

The lubricant of this invention is an amide of the general formula:

where R is a long chain hydrocarbon, generally derived from acids obtained from animal or vegetable sources, consisting of methylene, methyl, methine, and alkene groups. The length of R is between 12 and 30 carbons, preferably between 16 and 22. For example $CH_3(CH_2)_xCONH_2$, where x is between 12 and 30, preferably between 14 and 22. Most preferably, x=16. When x=16, the lubricant is stearamide, also commonly known as octadecanamide. Other possible variations on the basic structure are the presence of branching, or unsaturation sites, such with erucamide, that has the formula: $CH_3(CH_2)_7(CH=CH(CH_2)_{11}CONH_2$, or with oleamide, that has the formula: $CH_3(CH_2)_7CH=CH(CH_2)_7CONH_2$.

Although the lubricant may consist primarily of chains of a single length and chemical structure, it is recognized that minor components of slightly varying chain length or chemical structure may be included. In addition, mixtures of the lubricants of this invention may be used. For purposes of this invention, the lubricant layer may be continuous or semi-continuous.

The base support for the present invention can be cellulose derivatives such as a cellulose ester, cellulose triacetate, cellulose diacetate, cellulose acetate propionate, polyesters, such as polyethylene terephthalate or polyethylene naphthalate, poly-1,4-cyclohexanedimethylene terephthalate, polybutylene terphthalate, and copolymers thereof, polyimides, polyamides, polycarbonates, polystyrene, polyolefins, such as polyethylene, polypropylene, polysulfones, polyarylates, polyether imides and blends of these. The support typically employs an undercoat or a subbing layer well known in the art that comprises, for example, for a polyester support a vinylidene chloride/methyl acrylate/itaconic acid terpolymer or a vinylidene chloride/acrylonitrile/acrylic acid terpolymer.

The photographic elements according to this invention can contain one or more conducting layers such as antistatic layers and/or antihalation layers such as described in Research Disclosure, Vol. 176, December 1978, Item 17643 to prevent undesirable static discharges during manufacture, exposure and processing of the photographic element. Antistatic layers conventionally used for color films have been found to be satisfactory herewith. Any of the antistatic agents set forth in U.S. Pat. No. 5,147,768 which is incorporated herein by reference may be employed. Preferred antistatic agents include metal oxides, for example tin oxide, antimony doped tin oxide and vanadium pentoxide. These antistatic agents are preferably dispersed in a film forming binder.

The magnetic particles in the transparent magnetic layer can be ferromagnetic iron oxides, such as $\gamma\text{-Fe}_2O_3$, $Fe_3O_4$ $\gamma\text{-Fe}_2O_3$ or $Fe_3O_4$ with Co, Zn or other metals in solid solution or surface treated or ferromagnetic chromium dioxides, such as $CrO_2$ with metallic elements, for example Li, Na, Sn, Pb, Fe, Co, Ni, and Zn, or halogen atoms in solid solution. Ferromagnetic pigments with an oxide coating on their surface to improve their chemical stability or dispersability, as is commonly used in conventional magnetic recording, may also be used. In addition, magnetic oxides with a thicker layer of lower refractive index oxide or other material having a lower optical scattering cross-section as taught in U.S. Pat. Nos. 5,217,804 and 5,252,444 can be used. These are present in the transparent magnetic layer in the amount form about 1 to 10 weight percent based on the weight if the binder. The magnetic particles have a surface area greater than 30 $m_2/gm$ and a coverage of from about $1 \times 10^{-11}$ mg/$\mu m^3$ to $1 \times 10^{-10}$ mg/$\mu m^3$. A dispersing agent, or wetting agent can be present to facilitate the dispersion of the magnetic particles. This helps to minimize the agglomeration of the magnetic particles. Useful dispersing agents include fatty acid amines and commercially available wetting agents such as Witco Emcol CC59 which is a quaternary amine available from Witco Chemical Corp. Rhodafac PE 510, Rhodafac RE 610, Rhodafac RE960, and Rhodafac LO529, which are phosphoric acid esters available from Rhone-Poulenc.

The polymer binder of the transparent magnetic layer may be any polymer having good abrasion resistance. For example, cellulose esters such as cellulose diacetates and triacetates, cellulose acetate propionate, cellulose acetate butyrate, cellulose nitrate, polyacrylates such as polymethyl methacylate, polyphenylmethacrylate and copolymers with acrylic or methacrylic acid, or sulfonates, polyesters, polyurethanes, urea resins, melamine resins, urea-formaldehyde resins, polyacetals, polybuyrals, polyvinyl alcohol, epoxies and epoxy acrylates, phenoxy resins, polycarbonates, vinyl chloride-vinyl acetate copolymers, vinyl chloride-vinyl acetate-vinyl-alcohol copolymers, vinyl chloride-vinyl acetate-maleic acid polymers, vinyl chloride-vinylidene chloride copolymers, vinyl chloride-acrylonitrile copolymers, acrylic ester-acrylonitrile, copolymers, acrylic ester-vinylidene chloride copolymers, methacrylic ester-styrene copolymers, butadiene-acrylonitrile copolymers, acrylonitrile-butadiene-acrylic or methacrylic acid copolymers, styrene-butadiene copolymers can be used as binders in the transparent magnetic layer. Cellulose ester derivatives, such as cellulose diacetates and triacetates, cellulose acetate propionate, cellulose nitrate, and polyacrylates such as polymethyl methacrylate, polyphenylmethacrylate and copolymers with acrylic or methacrylic acid are preferred.

Abrasive particles useful in the magnetic layer or lubricant layer include nonmagnetic inorganic powders with a Mohs scale hardness of not less than 6. These include, for example, metal oxides such as alpha-alumina, chromium oxide ($Cr_2O_3$), alpha-$Fe_2O_3$, silicon dioxide, aluminosilicate and titanium dioxide. Carbides such as silicone carbide and titanium carbide, nitrides such as silicon nitride, titanium nitride and diamond in fine powder may also be used. Alpha alumina and silicon dioxide are preferred. These are included to improve the head cleaning properties and improve durability of the coating. A dispersing agent, or wetting agent can be present to facilitate the dispersion of the abrasive particles. This helps to minimize the agglomeration of the particles. Useful dispersing agents include, but are not limited to fatty acid amines and commercially available wetting agents such as Solsperse 24000 sold by Zeneca, Inc. (ICI). The abrasive particles have a median diameter of about 0.2 to 0.4 $\mu$m. The abrasive particles are present in the lubricious overcoat layer, in the transparent magnetic layer or in both the overcoat and the transparent magnetic layer. They are present in the magnetic layer in the amount of at least 2 weight percent based on the weight of the binder so that durability of the coating is achieved and clogging of the magnetic heads is prevented. The upper limit of the amount of abrasive particles is determined by the loss of transparency of the layer, adversely affecting the photographic element, and by their abrasive effectcs on the magnetic heads and the tools and photographic apparatus that the film comes in contact with, leading to premature wear of these tools and apparatus. Typically, the abrasive particles are present in the transparent magnetic layer in the amount of 2 wt % to about 20 wt % relative to the weight of the binder, and are present in the lubricating overcoat from about 0 wt. % to about 100 wt. %, relative to the weight of the lubricant in the overcoat.

Filler particles useful in the magnetic layer have a median diameter less than 0.15 μm, preferably less than 0.1 μm. The filler particles have a Mohs hardness greater than 6 and are present in the amount from about 0 to 300 percent, most preferably in the amount from about 0 to 85 percent based on the weight of the binder. Examples of filler particles include nonmagnetic inorganic powders such as γ-aluminum oxide, chromium oxide, iron oxide, tin oxide, doped tin oxide, silicon dioxide, alumino-silicate, titanium dioxide, silicon carbide, titanium carbide, and diamond in fine powder, as described in U.S. Pat. No. 5,432,050. A dispersing agent, or wetting agent can be present to facilitate the dispersion of the filler particles. This helps to minimize the agglomeration of the particles. Useful dispersing agents include, but are not limited to, fatty acid amines and commercially available wetting agents such as Solsperse 24000 sold by Zeneca, Inc. (ICI). Preferred filler particles are gamma-aluminum oxide and silicon dioxide.

The transparent magnetic layer may include coating aids and surfactants such as nonionic fluoringated alkyl esters such as FC-430, FC-431, FC-10, FC171 sold by Minnesota Mining and Manufacturing Co., Zonyl fluorochemicals such as Zonyl-FSN, Zonyl-FTS, Zonyl-TBS, Zonyl-BA sold by DuPont; polysiloxanes such as Dow Corning DC 1248, DC200, DC510, DC 190 and BYK 320, BYK 322, sold by BYK Chemie and SF 1079, SF1023, SF 1054, and SF 1080 sold by General Electric; polyoxyethylene-lauryl ether surfactants sold by Kodak; sorbitan laurate, palmitate and stearates such as Span surfactants sold by Aldrich.

The lube-containing solution may also contain surfactants, dispersants, or coating aids including, but not limited to, nonionic fluorinated alkyl esters such as FC-430, FC-431, FC-10, FC-171, FC-99, FC-143, FC-170C sold by Minnesota Mining and Manufacturing Co., Zonyl fluorochemicals such as Zonyl-FSN, Zonyl-FTS, Zonyl-TBS, Zonyl-BA sold by DuPont; fluorinated surfactants sold by Elf Atochem under the tradename of FORAFAC, polysiloxanes such as Dow Corning DC 1248, DC200, DC510, DC 190 and BYK 320, BYK 322, sold by BYK Chemie and SF 1079, SF1023, SF 1054, and SF 1080 sold by General Electric; Silwet surfactants sold by Union Carbide, polyoxyethylene-lauryl ether surfactants sold by Kodak; sorbitan laurate, palmitate and stearates such as Span surfactants sold by Aldrich, Triton X surfactants sold by Union Carbide, amine-containing surfactants, solsperse from ICI, and the like. However, these are not necessary for the invention.

Viscosity modifiers can be present in the lubricant layer or the transparent magnetic layer. Such viscosity modifiers include high molecular weight cellulose esters, celluosics, acrylics, urethanes, and polyethylene oxides.

Solvents useful for coating the lubricant layer or the transparent magnetic layer of the present invention include alcohols, ketones, chlorinated sovents, esters, water, hydrocarbons, ethers, or mixtures thereof.

In a particularly preferred embodiment, the imaging elements of this invention are photographic elements, such as photographic films, photographic papers or photographic glass plates, in which the image-forming layer is a radiation-sensitive silver halide emulsion layer. Such emulsion layers typically comprise a film-forming hydrophilic colloid. The most commonly used of these is gelatin and gelatin is a particularly preferred material for use in this invention. Useful gelatins include alkali-treated gelatin (cattle bone or hide gelatin), acid-treated gelatin (pigskin gelatin) and gelatin derivatives such as acetylated gelatin, phthalated gelatin and the like. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamide, poly (vinylpyrrolidone), and the like.

The photographic elements of the present invention can be simple black-and-white or monochrome elements comprising a support bearing a layer of light-sensitive silver halide emulsion or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

A preferred photographic element according to this invention comprises a support bearing at least one blue-sensitive silver halide emulsion layer having associated therewith a yellow image dye-providing material, at least one green-sensitive silver halide emulsion layer having associated therewith a magenta image dye-providing material and at least one red-sensitive silver halide emulsion layer having associated therewith a cyan image dye-providing material.

In addition to emulsion layers, the photographic elements of the present invention can contain one or more auxiliary layers conventional in photographic elements, such as overcoat layers, spacer layers, filter layers, interlayers, antihalation layers, pH lowering layers (sometimes referred to as acid layers and neutralizing layers), timing layers, opaque reflecting layers, opaque light-absorbing layers and the like. The support can be any suitable support used with photographic elements. Typical supports include polymeric films, paper (including polymer-coated paper), glass and the like. Details regarding supports and other layers of the photographic elements of this invention are contained in *Research Disclosure,* Item 36544, September, 1994.

The light-sensitive silver halide emulsions employed in the photographic elements of this invention can include coarse, regular or fine grain silver halide crystals or mixtures thereof and can be comprised of such silver halides as silver chloride, silver bromide, silver bromoiodide, silver chlorobromide, silver chloroiodide, silver chorobromoiodide, and mixtures thereof. The emulsions can be, for example, tabular grain light-sensitive silver halide emulsions. The emulsions can be negative-working or direct positive emulsions. The can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in *Research Disclosure,* Item 36544, September, 1994, and the references listed therein.

The photographic silver halide emulsions utilized in this invention can contain other addenda conventional in the photographic art. Useful addenda are described, for example, in *Research Disclosure,* Item 36544, September, 1994. Useful addenda include spectral sensitizing dyes, desensitizers, anitfoggants, masking couplers, DIR couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired.

Dye-image-providing materials employed with conventional color materials designed for processing with separate solution are preferably dye-forming couplers; i.e., compounds which couple with oxidized developing agent to form a dye. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

The present invention is illustrated by the following examples.

EXAMPLES

Example 1

The lubricious transparent magnetic layer is prepared by simultaneously coating solution A and B to a dry thickness of about 1.2 microns onto a support consisting of subbed polyethylene terephthalate containing a vanadium pentoxide layer.

Solution A, which is the closest to the support is generated by dispersing the magnetic particles (CSF-4085V2) and abrasive particles (E-600) in their respective solvents and respective stabilizing agents and adding these with a high shear mixer to a cellulose diacetate/cellulose triacetate solution in methylene chloride/acetone/methyl acetoacetate solvent mixture. A coating aid (optional), either FC-430 or FC-431, (3M Corporation) is added with low shear mixing. The composition of solution A is indicated in Table I below.

TABLE I

Composition of solution A

| Ingredient | Percent of Solution A |
|---|---|
| Cellulose diacetate [CA398-30] from Eastman Chemical Co. | 0.18 |
| Cellulose triacetate [CTA436-80S] from Eastman Chemical Co. | 2.45 |
| Rhodafac PE510 surfactant | 0.006 |
| CSF-4085V2 from Toda Kogyo | 0.12 |
| E-600 from Norton Chemical | 0.08 |
| Solsperse 24000 dispersant from Zeneca, Inc (ICI), | 0.004 |
| FC-430 from 3M Corporation | 0.02 |
| Dibutyl phthalate | 0.14 |
| Methylene chloride | 67.90 |
| Acetone | 24.25 |
| Methyl acetoacetate | 4.85 |

Solution B, coated furthest from the support, consists of 0.5 wt % stearamide in a 50/50 mixture of methylene chloride and isobutyl alcohol. The solution is coated to give a nominal dry thickness of stearamide of 0.024 microns.

The magnetic oxide solution (A) is prepared and metered to the bottom cavity and slot of a slot-die plus slide coating apparatus. The lubricant solution (B) is prepared and metered to the top cavity and slot of the same slot-die plus slide coating apparatus. A coating apparatus of this type for multiple coatings is described in U.S. Pat. Nos. 2,761,417 and 2,761,791 (both 1956) by T. A. Russell et al. Slot heights are sized to achieve the required cavity pressures for widthwise uniformity. The slot-die plus slide is positioned at a spacing of 2–20 mils relative to the moving support, a vacuum is applied to the lower meniscus, and a liquid bead is established between the lips of the slot-die and the support such that a continuous coating is formed with the magnetic layer on the bottom and the wax layer on the top. The coated support is then conveyed through the dryers.

Any multilayer coating apparatus can be used which can simultaneously deposit two or more solution layers onto a moving support. This list includes two layer slot-dies, X-slide, dual X, multilayer slide bead, or multilayer curtain coating machines.

In this configuration, solutions A and B are in wet contact in the area of the coating bead, and are subsequently dried simultaneously. The dried coating will thus consist of a transparent magnetic layer that has a sufficient amount of stearamide at the surface, which is the outermost surface from the support and the side opposite from the emulsion on a photographic element, to provide adequate lubrication to provide durable performance when the layer is in contact with a magnetic head.

The coefficient of friction (COF) of this dried package was measured using standard known methods, such as those described in ASTM method designation: D 1894-78. For the practical purposes of the described invention either an IMASS Ball Sled friction tester or a paper clip friction tester were used. In the Ball Sled test, three tungsten balls are mounted in a triangular geometry onto a rigid support. The test sample is placed flat on another rigid support with the lubricious side of the sample facing upwards. The balls are then brought into contact with the test specimen and the sled is mechanically driven and set into horizontal motion, so that the test specimen and the balls are moving relative to each other. The force needed to sustain movement of the two surfaces relative to each other is measured and is related to the coefficient of friction (COF). A friction value less than 0.35, preferably less than 0.26, is desirable. The Paper Clip Friction test utilizes a U-shaped frictional slider cut from a steel paper clip. The rounded part of the slider contacts the sample in this test. A ¾" by 6" piece of the sample to be evaluated is secured on the inclined plane of the device, the lubricated surface facing upward. The inclined plane is then raised to an arbitrarily chosen angle ($\theta$) and the frictional slider is placed on the sample. The paper clip and produces a load of 63.2 $\cos\theta$ grams perpendicular to the sample surface. If the paper clip continuously slides down the coated sample, the angle of the inclined plane is decreased until the paper clip does not slide. The lowest angle in which the paper clip slides continuously down the sample corresponds to a COF which is determined from a calibrated scale on the inclined plane. The smaller the angle needed for the paper clip to continuously slide on the coated sample, the lower the COF.

The durability of the coating was tested with a rotating drum friction tester (RDFT) where a narrow (½ in) strip of the sample is placed in contact with a 4" diameter stainless steel drum utilizing a 180° wrap angle. One end of the sample is fixed and a 50 g load is placed on the other end of the sample. The lubricated side of the sample is in contact with the drum. The drum is rotated at 10.5"/sec and the friction between the drum and the sample is measured for a 10 minute time period. Desired results are a very flat and low friction ($\mu f$) vs time curve for the duration of the test. The test is repeated on three different portions of the coating. Samples that "pass" will endure the entire test, maintaining a low friction. Samples that "fail" show increasing friction with time during the test. The latter indicates insufficient lubrication of the surface of the coating, or a coating with poor physical properties.

The dried transparent magnetic layer of Example 1 had a measured COF of 0.15 and passed the RDFT test, as indicated in Table II.

Table II lists the results for other examples and comparative examples that were prepared as in Example 1, differing only by the composition of Solution B.

TABLE II

| | Lube in solution B | Solvent for solution B | nominal dry thickness of lube (microns) | COF | RDFT |
|---|---|---|---|---|---|
| EX 1 | stearamide | DCM/IBA 50/50 | 0.024 | 0.15 | pass |
| EX 2 | stearamide | DCM/IBA 50/50 | 0.056 | 0.11 | pass |
| EX 3 | stearamide | DCM/IBA 50/50 | 0.037 | 0.08 | pass |
| CE 4 | decyl stearate | DCM/acetone/MAA 70/25/5 | 0.025 | 0.44 | fail |
| CE 5 | sodium stearate | DCM/methanol 50/50 | 0.025 | 0.23 | fail |
| CE 6 | sodium stearate | methanol | 0.02 | 0.18 | fail |
| CE 7 | sodium stearate | DCM/methanol 25/75 | 0.075 | 0.19 | fail |
| CE 8 | isocetyl stearate | ethyl acetate | 0.02 | 0.28 | fail |
| CE 9 | lauryl stearate | DCM/IBA 50/50 | 0.056 | 0.28 | fail |
| CE 10 | lithium stearate | DCM/methanol 25/75 | 0.049 | 0.10 | fail |

CE: comparative example
DCM: methylene chloride
MAA: methyl acetoacetate

The examples and comparative examples of Table II illustrate that only the amide-containing long chain fatty acid resulted in coatings with acceptable COF and good durability as shown by RDFT.

The invention has been described in detail with particular reference to certain preferred embodiments thereof, but it will be understood that variations and modifications can be effected within the spirit and scope of the invention.

What is claimed is:

1. A method of producing an imaging support comprising:
   providing a support,
   simultaneously coating on a side of the support; a transparent magnetic recording layer comprising magnetic particles, a polymeric binder and an organic solvent, and a lubricating overcoat layer farthest from the support, the lubricating overcoat layer comprising a lubricant of the general formula:

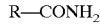

R—CONH$_2$ where R is a long chain hydrocarbon between 12 and 30 carbons, preferably between 16 and 22, and an organic solvent; and
   drying the magnetic recording layer and the lubricating overcoat layer.

2. The method of claim 1, wherein the lubricant comprises octadecanamide.

3. The method of claim 1, wherein R of the lubricant is linear or branched, saturated or unsaturated.

4. The method of claim 1, wherein the organic solvent of the magnetic layer is selected from the group consisting of alcohols, ketones, chlorinated sovents, esters, water, hydrocarbons, and ethers.

5. The method of claim 1, wherein the organic solvent of the lubricant layer is selected from the group consisting of alcohols, ketones, chlorinated sovents, esters, water, hydrocarbons, and ethers.

6. The method of claim 1, wherein the magnetic particles have a surface area greater than 30 m$^2$/gm and a coverage of from about $1 \times 10^{-11}$ mg/$\mu$m$^3$ to $1 \times 10^{-10}$ mg/$\mu$m$^3$.

7. The method of claim 1, wherein the polymeric binder is selected from the group consisting of cellulose esters, polyacrylates, copolymers with acrylic acid, copolymers with methacrylic acid, sulfonates, polyesters, polyurethanes, urea resins, melamine resins, urea-formaldehyde resins, polyacetals, polybutyrals, polyvinyl alcohol, epoxies, epoxy acrylates, phenoxy resins, polycarbonates, vinyl chloride-vinyl acetate copolymers, vinyl chloride-vinyl acetate-vinyl-alcohol copolymers, vinyl chloride-vinyl acetate-maleic acid polymers, vinyl chloride-vinylidene chloride copolymers, vinyl chloride-acrylonitrile copolymers, acrylic ester-acrylonitrile copolymers, acrylic ester-vinylidene chloride copolymers, methacrylic ester-styrene copolymers, butadiene-acrylonitrile copolymers, acrylonitrile-butadiene-acrylic or methacrylic acid copolymers and styrene-butadiene copolymers.

8. The method of claim 1, wherein the lubricating overcoat layer further comprises viscosity modifiers, surfactants, abrasive particles, dispersants, or coating aids.

* * * * *